US007801955B2

(12) United States Patent
Dayan et al.

(10) Patent No.: US 7,801,955 B2
(45) Date of Patent: Sep. 21, 2010

(54) DISTRIBUTED METRICS COLLECTION

(75) Inventors: Tal Dayan, Los Gatos, CA (US); Brian Chatham, Fremont, CA (US)

(73) Assignee: Google Inc., Mountain View, CA (US)

( * ) Notice: Subject to any disclaimer, the term of this patent is extended or adjusted under 35 U.S.C. 154(b) by 410 days.

(21) Appl. No.: 11/455,084

(22) Filed: Jun. 16, 2006

(65) Prior Publication Data

US 2007/0293144 A1 Dec. 20, 2007

(51) Int. Cl.
*G06F 13/00* (2006.01)

(52) U.S. Cl. .................. 709/204; 709/205; 709/220; 715/753

(58) Field of Classification Search .................. 709/204, 709/205, 220–222, 223, 224; 715/751–759; 434/350–352
See application file for complete search history.

(56) References Cited

U.S. PATENT DOCUMENTS

| 6,795,855 | B2 * | 9/2004 | Bonilla et al. .............. 709/223 |
| 7,039,917 | B2 * | 5/2006 | Lister et al. ............... 718/107 |
| 7,363,359 | B1 * | 4/2008 | Tripathy et al. ............ 709/223 |
| 7,546,359 | B2 * | 6/2009 | Tierney et al. ............. 709/223 |
| 2002/0174256 | A1 * | 11/2002 | Bonilla et al. .............. 709/310 |
| 2003/0236820 | A1 * | 12/2003 | Tierney et al. ............. 709/203 |
| 2005/0081156 | A1 * | 4/2005 | Clark et al. ................. 715/736 |

OTHER PUBLICATIONS

Andrew S. Tanenbaum; Structured Computer Organization, Second Edition; pp. 10-12; 1984.*
Deligiannakis, A., et al., *Hierarchical In-Network Data Aggregation with Quality Guarantees*, Proceedings of EDBT, 2004, pp. 658-675.
Krishnamachari, B., et al., *The Impact of Data Aggregation in Wireless Sensor Networks*, Proceedings of the 22nd International Conference on Distributed Computing Systems Workshops, 2002, pp. 575-578.
Massie, M. et al., *The Ganglia Distributed Monitoring System: Design, Implementation, and Experience*, Parallel Computing, Jul. 2004, vol. 30, Issue 7, pp. 817-840.
Winfield, A., *Distributed Sensing and Data Collection Via Broken Ad Hoc Wireless Connected Networks of Mobile Robots*, Distributed Autonomous Robotic Systems, 2000, pp. 273-282.

* cited by examiner

*Primary Examiner*—Kenneth R Coulter
(74) *Attorney, Agent, or Firm*—Sterne, Kessler, Goldstein & Fox PLLC (57) ABSTRACT

Distributed metrics collection systems and methods can be used to help bind together a large organization by implementing both formal and informal information flows. Hierarchical reporting and tasking are formal information flows. Gossip is an informal information flow. Users use a set of modules to configure distributed metrics collection. Management type users can configure data flows that appear similar to hierarchical reporting. All users can configure data flows that simply distribute items of interest. Over time, the data flows evolve in an organic manner as users appear, move, change interests, and leave.

14 Claims, 11 Drawing Sheets

```
<nodeDatum type=coder source=kyle>
  <coder>kyle</coder>
  <lines>111</lines>
</nodeDatum>
```
— 1001

```
<nodeDatum type=coder source=cartman>
  <coder>stan</coder>
  <lines>66</lines>
</nodeDatum>
```
— 1002

```
<nodeDatum type=coder source=kenny>
  <coder>kenny</coder>
  <lines>141</lines>
</nodeDatum>
```
— 1003

```
<nodeDatum type=coder source=cartman>
  <coder>cartman</coder>
  <lines>214</lines>
</nodeDatum>
```
— 1004

```
<nodeDatum type=Org source=garrison>
  <Org>gradeThree</Org>
  <leader>garrison</leader>
  <lines>532</lines>
</nodeDatum>
```
— 1005

DISTRIBUTED METRICS COLLECTION

TECHNICAL FIELD

Embodiments relate to the fields of data collection and data distribution. Embodiments also relate to the field of providing systems and methods for creating ad hoc data distribution networks to a distributed group of users.

BACKGROUND

Communications within an organization are critical for coordinating effort, gathering planning data, distributing plans and goals, and tracking performance. Organizational communications tend to occur along two different channels. One channel is a rigidly defined communications hierarchy that is governed by organizational structures and policies. The second channel is gossip transmitted by mouth, informal email, or other messaging. The reason that the two channels must exist is that central planners can not predict, plan, and define all the information flows required in a healthy organization.

Organizational structures, however, are changing. A loosely defined structure containing informally defined groups that work cooperatively can often outperform a rigidly defined corporate structure having mandates from above and reporting from below. Groups of people having similar interests, goals, or vision often form informal groups and perform work that pleases the group members. The work itself can range from playing in a band to simulating protein folding at the molecular level.

Some organizations attempt to stifle all work that is not part of a larger plan. Other organizations try to harness the creative energies and efforts of the informal groups. Unfortunately, harnessing usually results in transforming an informal group into a rigidly defined group and loses the benefits of informality. One of the benefits of informal groups is a natural sharing of the group vision. A second benefit is a nuanced evolution of the group vision. Another benefit is the sense of ownership shared by the group members.

Formal organizations having rigidly defined hierarchies and communications also have benefits and strengths. For example, progress reports can help identify projects that are over performing, underperforming, stagnating, in need of help, or nearing an important milestone. Furthermore, rigidly structured organizations can excel at marshalling resources and coordinating large projects. Furthermore, a greater number of people can currently be organized hierarchically than informally. Large organizations actually benefit from having rigidly defined communications channels.

Systems and methods that allow the data sharing and communications typical of informal groups to pervade a large organization are needed so that smaller informal type groups can benefit from membership in large organizations and so that large organizations can benefit from the vision and dynamic nature of smaller informal groups.

BRIEF SUMMARY

The following summary is provided to facilitate an understanding of some of the innovative features unique to the embodiments and is not intended to be a full description. A full appreciation of the various aspects of the embodiments can be gained by taking the entire specification, claims, drawings, and abstract as a whole.

Systems and methods that allow the data sharing and communications typical of informal groups to pervade a large organization can be realized through distributed metrics collection.

It is therefore an aspect of the embodiments to provide a node creation module, a report definition module, a data source configuration module, and a transform configuration module. Users are allowed to create nodes and configure nodes. Users can configure nodes to receive data from other nodes and to send data to other nodes.

Data security is important when any user can create and configure nodes. A node signature can be used to sign data before transmitting it such that a node receiving the data can verify that it was transmitted by the correct node and is not forged. A datum security tag can be used to ensure that the data sent by a node is not altered in transit. A datum security tag can also be used to encrypt data such that only authorized recipients can access the data by decrypting it. Those practiced in the arts of data security, network security, and computer security know of many algorithms and techniques for signing data, encrypting data, and decrypting data. For example, node signatures can be based on the SHA-1 secure hash algorithm and datum security tags can be based on AES encryption.

Node security is also important. Node access can be restricted based on a node security tag. A node security tag can be used to restrict access to a node. Access includes any node configuration such as who can configure the node, which nodes can receive data from the secured node, and which nodes can send data to the secured node. Those skilled in computer security or computer user management know of many ways to use security tags, such as passwords, for securing access.

It is another aspect of the embodiments that a user can configure a node to transform data. For example a node can be configured to receive a first number from another node, to receive a second number from yet another node, add the two numbers together to produce a third number, and send all three numbers to a fourth node. A node can be configured to perform other transformations, including filtering, concatenation, formatting, subtraction, multiplication, and division. Encryption, decryption, and signing, as discussed above, are also data transforms.

It is yet another aspect of the embodiments that a user can configure a node to receive data from a data source. A data source can be a person entering data into a form, can be instrumentation such as a material handling port in a factory, or can be a reporting device on a robot shooting laser beams at targets. Regardless of the data source, a node can be configured to format the data for transmission to other nodes in a distributed metrics collection system.

It is still yet another aspect of the embodiments that a user can configure a node to produce a report. A node can receive data from data sources and other nodes and use the data to produce a report. The report can be an email message, text message, or other message type that is sent to a person or distribution list. The report can be a web page that can be downloaded. The report can be a data stream that updates data in a display, such as a stock ticker or a real time graph of outside air temperature. Those skilled in the art of data networking know of many techniques for transforming data into reports and distributing the reports.

It is an aspect of certain embodiments to provide a user configuration module and then allowing users to configure other users. As such, a group leader can hire a person and then configure a distributed metrics collection system to allow the new employee to configure nodes. Security tags can be used to restrict configuration module access such that certain people can configure new users or certain people cannot. Access to node creation modules or node configuration modules can be similarly restricted.

A user creation module can also be used to populate a distributed metrics system with users. A first user, the first generation user, can configure second generation users who configure third generation users and so forth. The users configure data sources, nodes, and reports. Eventually, data flowing through the nodes binds together a large organization with numerous data gathering, analysis, and reporting mechanisms that develop organically from within the organization.

BRIEF DESCRIPTION OF THE DRAWINGS

The accompanying figures, in which like reference numerals refer to identical or functionally similar elements throughout the separate views and which are incorporated in and form a part of the specification, further illustrate the present invention and, together with the background of the invention, brief summary of the invention, and detailed description of the invention, serve to explain the principles of the present invention.

DETAILED DESCRIPTION

The particular values and configurations discussed in these non-limiting examples can be varied and are cited merely to illustrate embodiments and are not intended to limit the scope of the invention.

Overview

Distributed metrics collection systems and methods can be used to help bind together a large organization by implementing both formal and informal information flows. Hierarchical reporting and tasking are formal information flows. Gossip is an informal information flow. Users use a set of modules to configure distributed metrics collection. Management type users can configure data flows that appear similar to hierarchical reporting. All users can configure data flows that simply distribute items of interest. Over time, the data flows evolve in an organic manner as users appear, move, change interests, and leave.

High Level Process Flow

Figure 1:
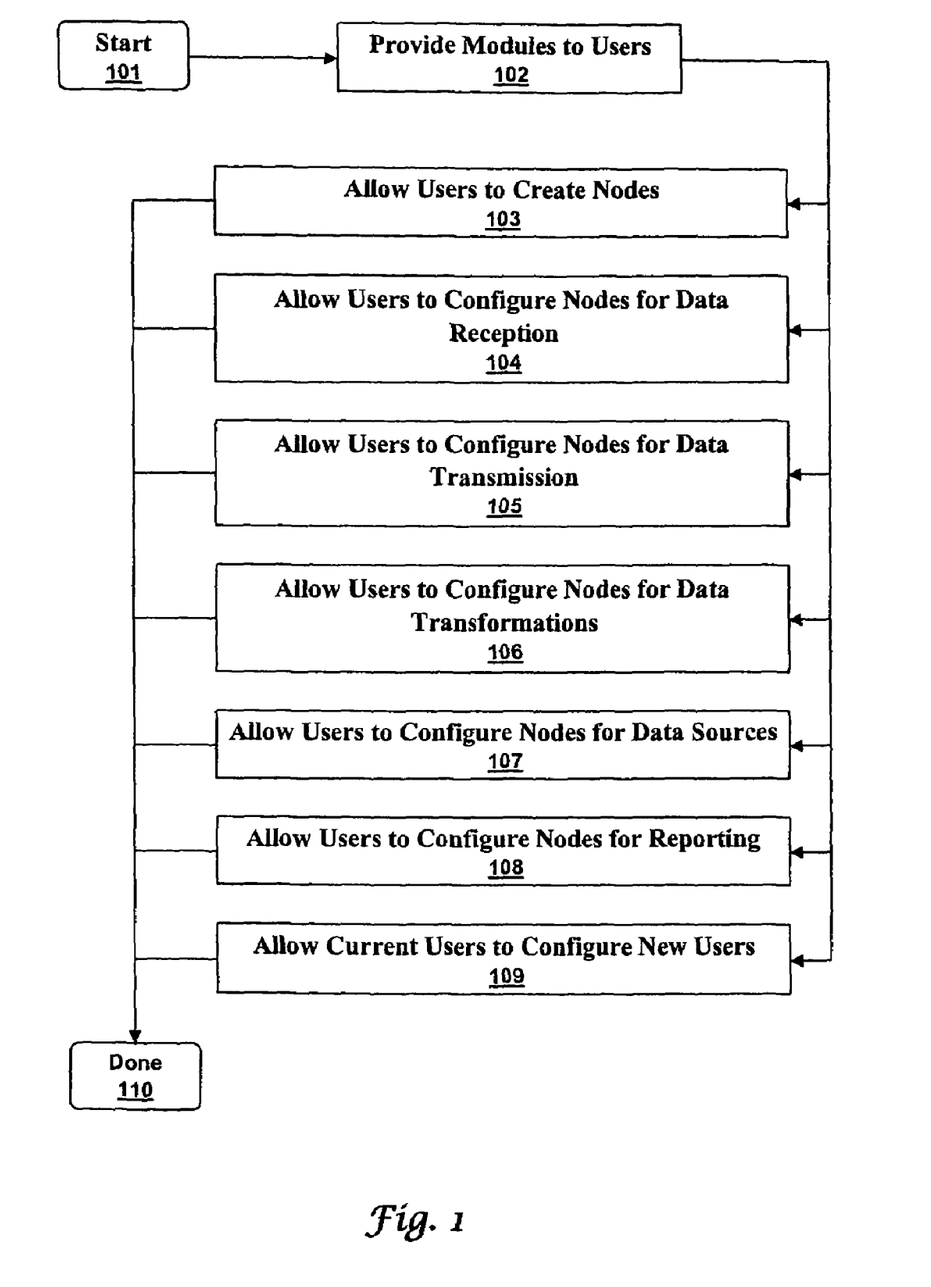
FIG. 1 illustrates a high level flow diagram of creating the foundation of a distributed metrics collection system in accordance with aspects of the embodiments.

FIG. 1 illustrates a high level flow diagram of creating the foundation of a distributed metrics collection system in accordance with aspects of the embodiments. After the start 101, modules are provided to users 102. The modules can include a user configuration module, a node creation module, a node configuration module, a report definition module, a data source configuration module, and a transform configuration module. Users can then be allowed to use the modules. A security policy associated with a module can restrict which users can actually use the module. Users can be allowed to create nodes 103, configure nodes for reception 104, or configure nodes for transmission 105. In most cases, a user configures a first node to transmit data to a second node and configures the second node to receive the data. Users can be allowed to configure nodes to transform data 106. Users can be allowed to configure nodes for data sources 107, meaning some nodes can receive raw data from outside the distributed metrics collection system, format the data for distribution, and then transmit it. Users can be allowed to configure nodes for reporting 108. Users can be allowed to configure new users 109. Finally, the process is done 110.

Figure 2:
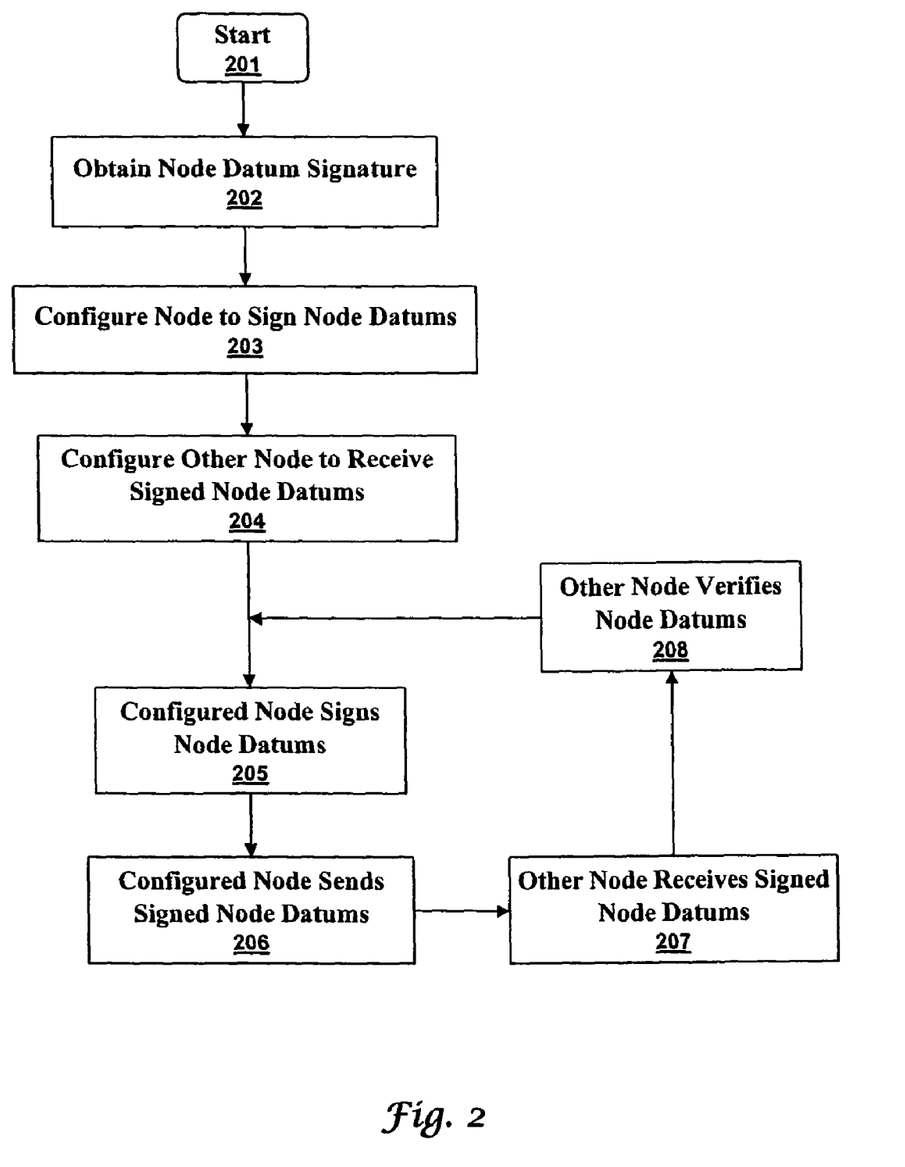
FIG. 2 illustrates a high level flow diagram of using node datum signatures in accordance with aspects of certain embodiments.

FIG. 2 illustrates a high level flow diagram of using node datum signatures in accordance with aspects of certain embodiments. After the start 201, a node datum signature, such as a secure hash key, is obtained 202. A node is configured to sign data 203 and another node is configured to receive the signed data 204. Data is signed 205 and sent 206 to be received by the other node 207. The data is then verified 208 to ensure that it is not forged or altered. The process can iterate with the transmission and reception of more signed data. Those skilled in the art of network security are familiar with using secure hash algorithms, such as MD5, SHA, SHA-1, and others for signing data.

Figure 3:
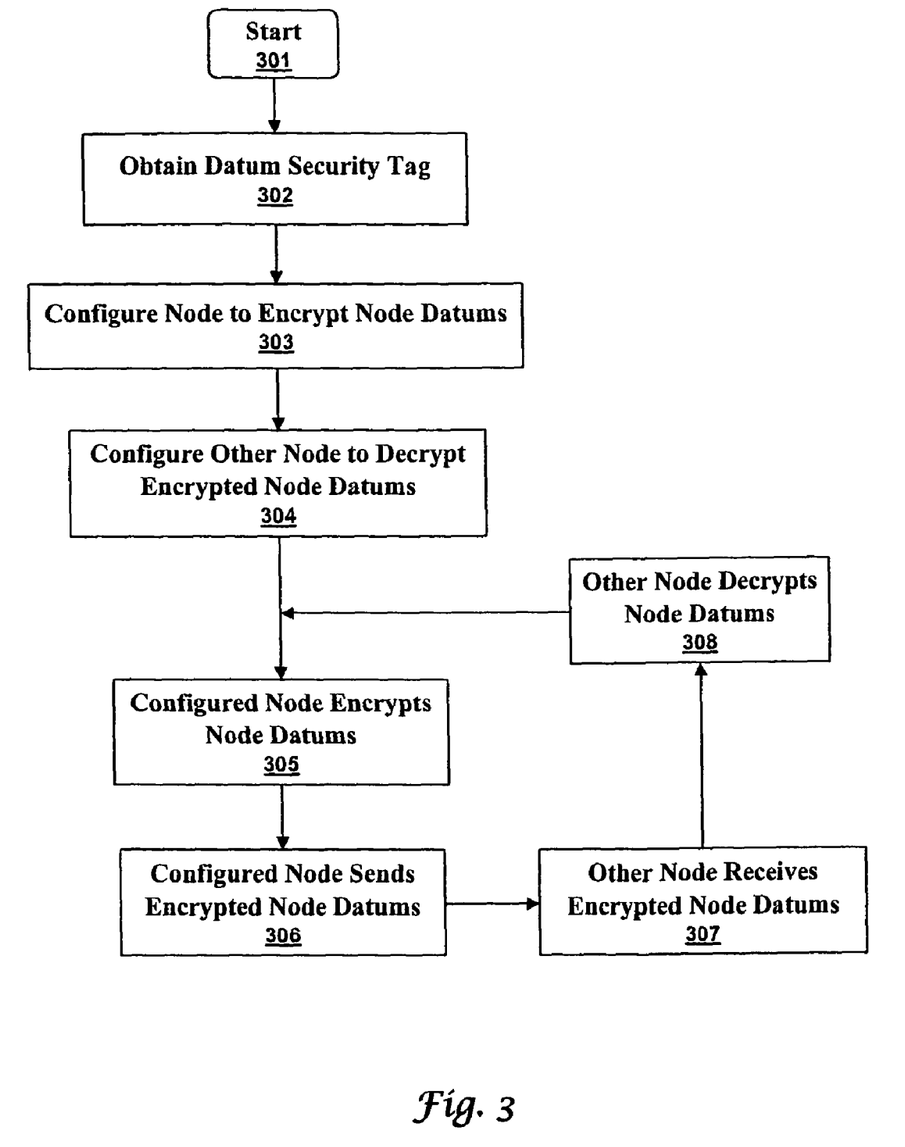
FIG. 3 illustrates a high level flow diagram of using datum security tags in accordance with aspects of certain embodiments.

FIG. 3 illustrates a high level flow diagram of using datum security tags in accordance with aspects of certain embodiments. After the start 301 a datum security tag, such as the private key of an encryption key pair, is obtained 302. A node is configured to encrypt data 303 and another node is configured to decrypt the data 304. Data is encrypted 305 and sent 306 to be received by the other node 307. The data is then decrypted 308 and the process can iterate with the transmission and reception of more encrypted data. Those skilled in the art of network security are familiar with using encryption algorithms, such as RSA, AES, blowfish, and others for encrypting data.

Figure 4:
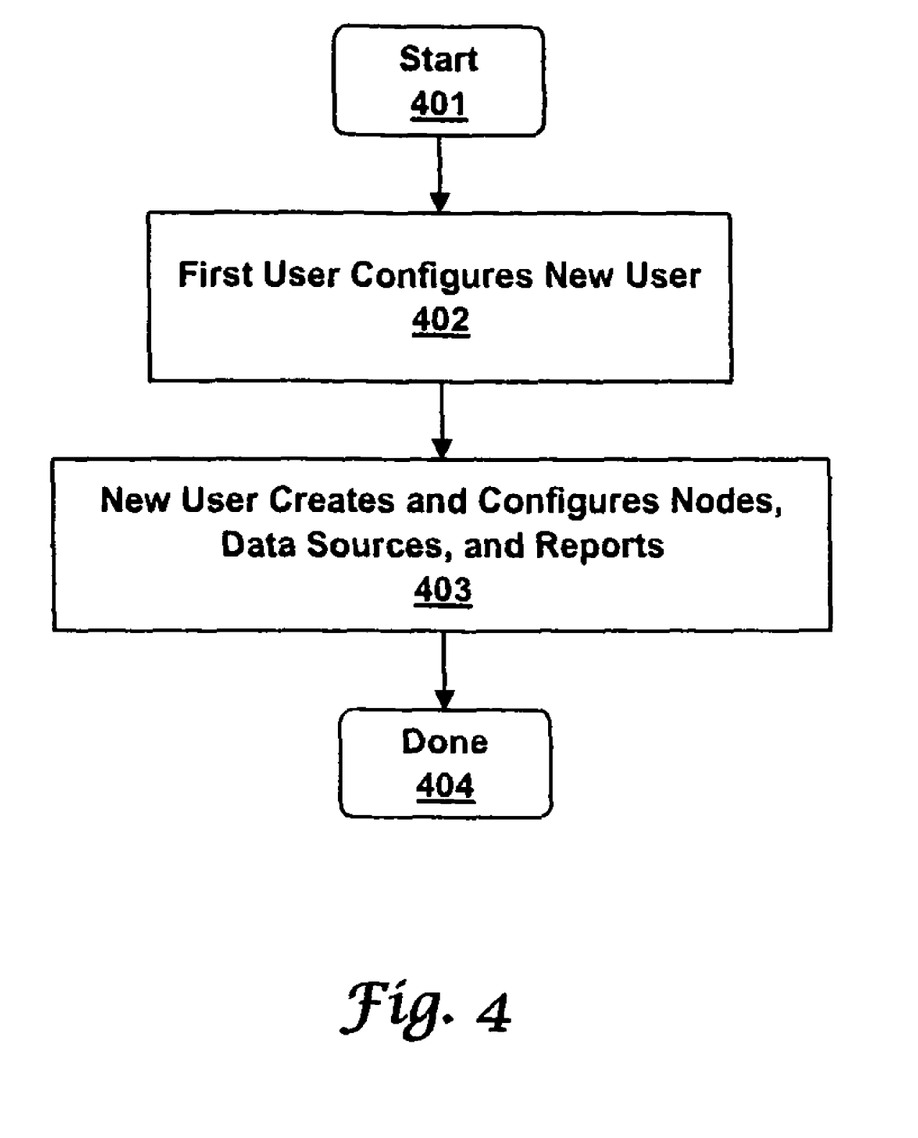
FIG. 4 illustrates a high level flow diagram of populating and configuring a distributed metrics collection system in accordance with aspects of certain embodiments.

FIG. 4 illustrates a high level flow diagram of populating and configuring a distributed metrics collection system in accordance with aspects of certain embodiments. After the start 401 a first user configures a second user 402 to access and use the modules of a distributed metrics collection system. The new user then creates and configures nodes, data sources, and reports 403 before the process is done 404.

Architectural Overview

Figure 5:
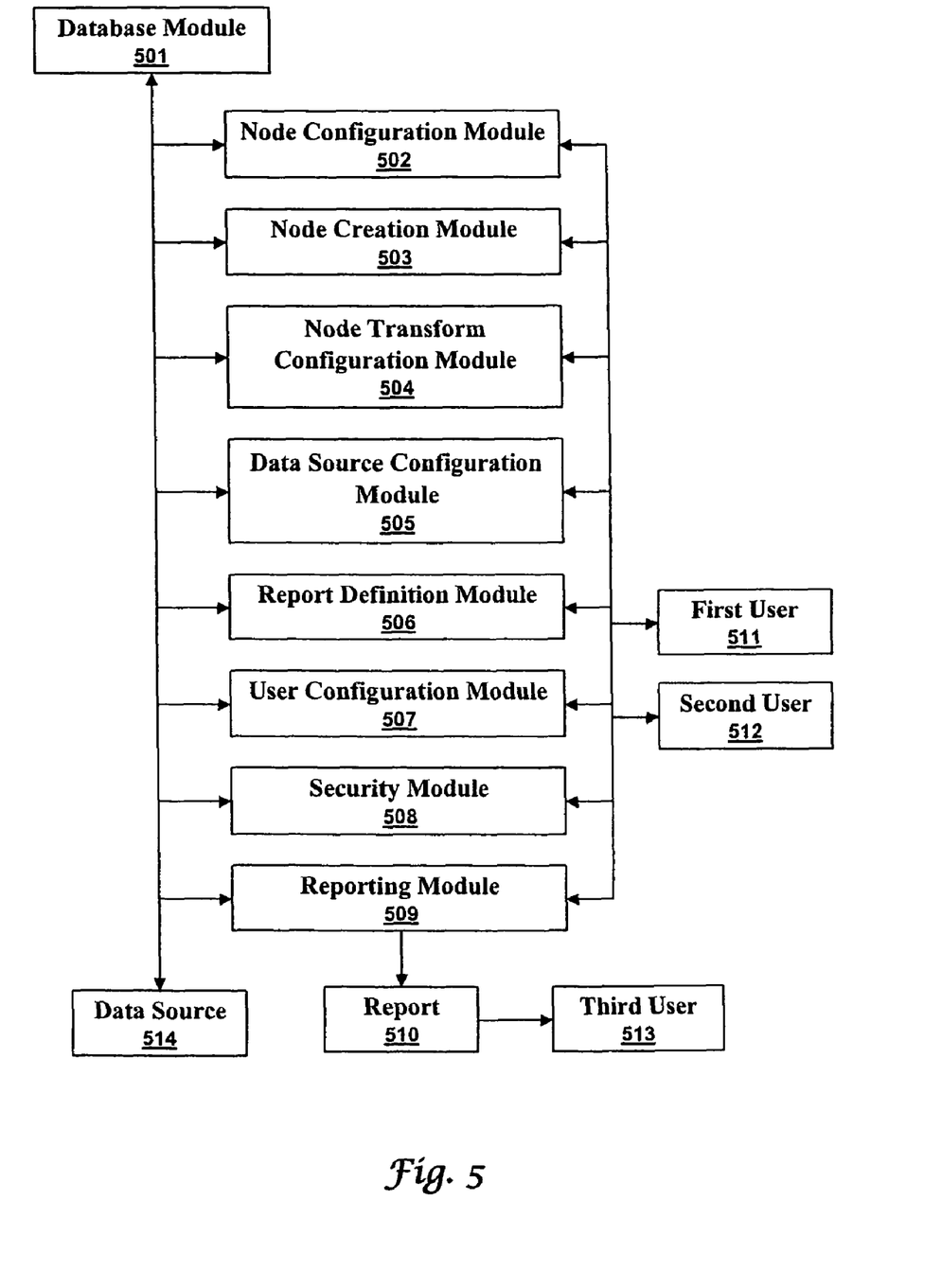
FIG. 5 illustrates a distributed metrics collection system in accordance with aspects of the embodiments.

FIG. 5 illustrates a distributed metrics collection system in accordance with aspects of the embodiments. A database module 501 stores configuration data for nodes, data sources, and reports. As is common with current databases, the database module 501 can include a distributed database that is shared and replicated across many computers. A node creation module 503 creates a new node within the database module 501. A node configuration module 502 sets node data within the database module 501. A node transform configuration module 504 sets configuration data within the database module 501 that governs how a node will transform data. A data source configuration module 505 sets up a data source 514 to transmit data in accordance with at least one node whose configuration is stored within the database module 501. The data source configuration module 505 can also set node configuration data in the database module 501 such that a node receives data from the data source 514.

A report definition module 506 can store a report configuration within the database module 501 that the reporting module 509 can access and use to create a report 510 that is sent to a third user 513. A user configuration module 507 sets user data within the database module 501. A security module 508 can produce security tags and signatures for encrypting data, can encrypt and decrypt node data, and can authenticate users.

As an example, a first user 511 can log into the system using a security tag obtained from the security module 508. The security module 508 authenticates the first user 511 using user data stored in the database module 501 and algorithms in the security module 508. The first user 511 uses the user configuration module 507 to set up a second user 512. The second user 512 uses the data source configuration module 505 to configure a data source 514 to transmit data into the distributed metrics system. For this example, the data source 514 transmits the number of gum balls sold in the preceding hour. The second user 512 also uses the node configuration module 502 and the node transform configuration module 504 to configure a node to receive the data and produce histogram data of gum ball sales against time of day. The user uses the report definition module 506 to define a report that shows a graph of the histogram data.

As the system operates, the data source 514 sends sales data to the database module 501 that, through a series of triggers, distributes the data among nodes, produces histogram data, and sends it to the reporting module 509. The reporting module 509 uses the report definition stored in the database module 501 to produce a report 510 containing a histogram graph which is then emailed to a third user 513. Those skilled in the art of relational databases are familiar with automatically sending data to a database such that a trigger is executed. A trigger is an action that the database automatically performs when an event happens. Furthermore, one triggered action can trigger another action. As such, a node can be stored as a row in a database table, data transforms can be triggered actions, and data transmission between nodes can result from a cascade of triggers.

Figure 6:
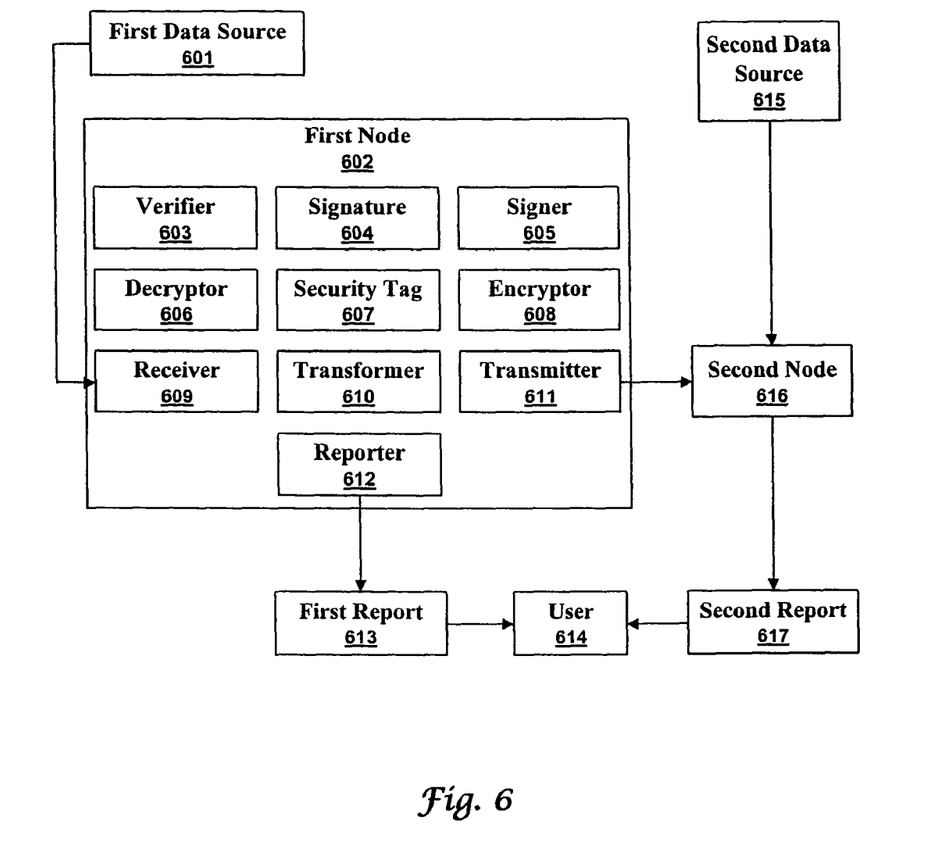
FIG. 6 illustrates a node within a distributed metrics collection system in accordance with aspects of the embodiments.

FIG. 6 illustrates a node 602 within a distributed metrics collection system in accordance with aspects of the embodiments. A first data source 601 can send data to a receiver in a first node 602. As discussed above, the data reception can be a database command causing a database module to perform a triggered activity. After receiving the data, a decryptor 606 can decrypt it using a security tag 607. A verifier 603 can also authenticate the data. A transformer 610 can transform the data which a signer 605 then signs using a signature 604. An encryptor can then use the security tag 607 to encrypt the transformed data that a transmitter 611 sends to a second node 616. A reporter 612 in the first node 602 creates a first report 613 for a user 614. A second data source 615 also produces data for the second node 616. The second node 616 combines the data it receives and produces a second report 617 for the user 614.

Figure 7:
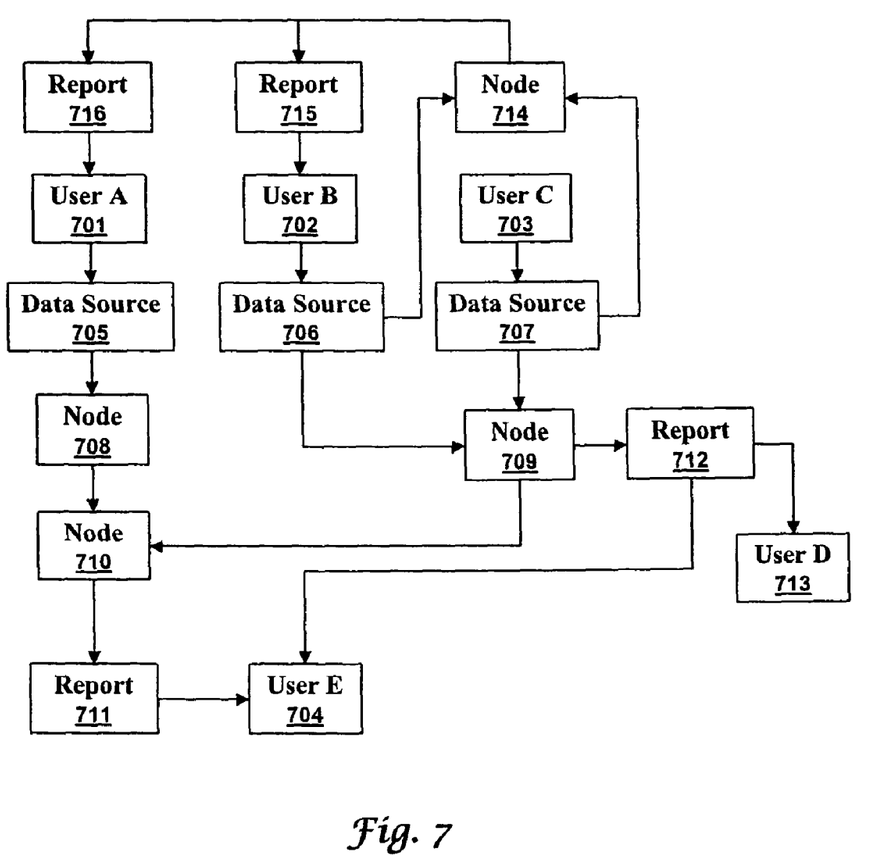
FIG. 7 illustrates employees reporting to management in accordance with aspects of the embodiments.

FIG. 7 illustrates employees reporting to management in accordance with aspects of the embodiments. User A 701, user B 702, and user C 703 are employees. They submit progress reports through their respective data sources 705, 706, and 707. Users B 702 and C 703 work for user D 713. As such, their data goes to node 709 where a report 712 is generated and sent to user D 713. Users A 701 and D 713 work for user E 704 and submit data by way of node 710 and report 711. Therefore, the user A 701 data is transmitted to node 708 and then to node 710 while the user D data goes from node 709 to node 710. User E, however, likes the details and has configured the system to send over report 712. User A 701, being nosey and not restricted from doing so, has configured node 714 to receive the data from users B 702 and C 703 and to produce report 716. User B, being suspicious of user A, configured node 714 to also send report 715.

Figure 8:
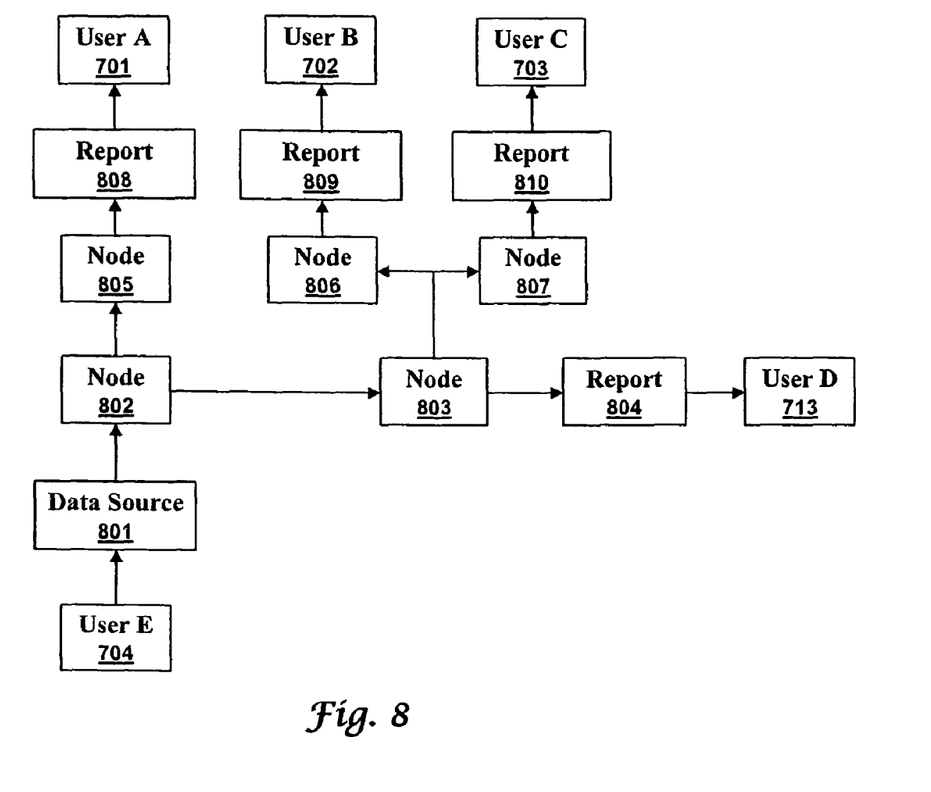
FIG. 8 illustrates management tasking employees in accordance with aspects of the embodiments.

FIG. 8 illustrates management tasking employees in accordance with aspects of the embodiments. User E 704 submits tasks to node 802 via data source 801. Node 802 is configured to divide the tasks between user A 701 and user D 713. User A receives the tasking via node 805 and report 808. Node 803 is configured to distribute tasks between users B 702 and C 703 and to report the tasking to user D 713 via report 804. User B 702 receives tasking via node 806 and report 809 while user C 703 receives tasking via node 807 and report 810.

Figure 9:
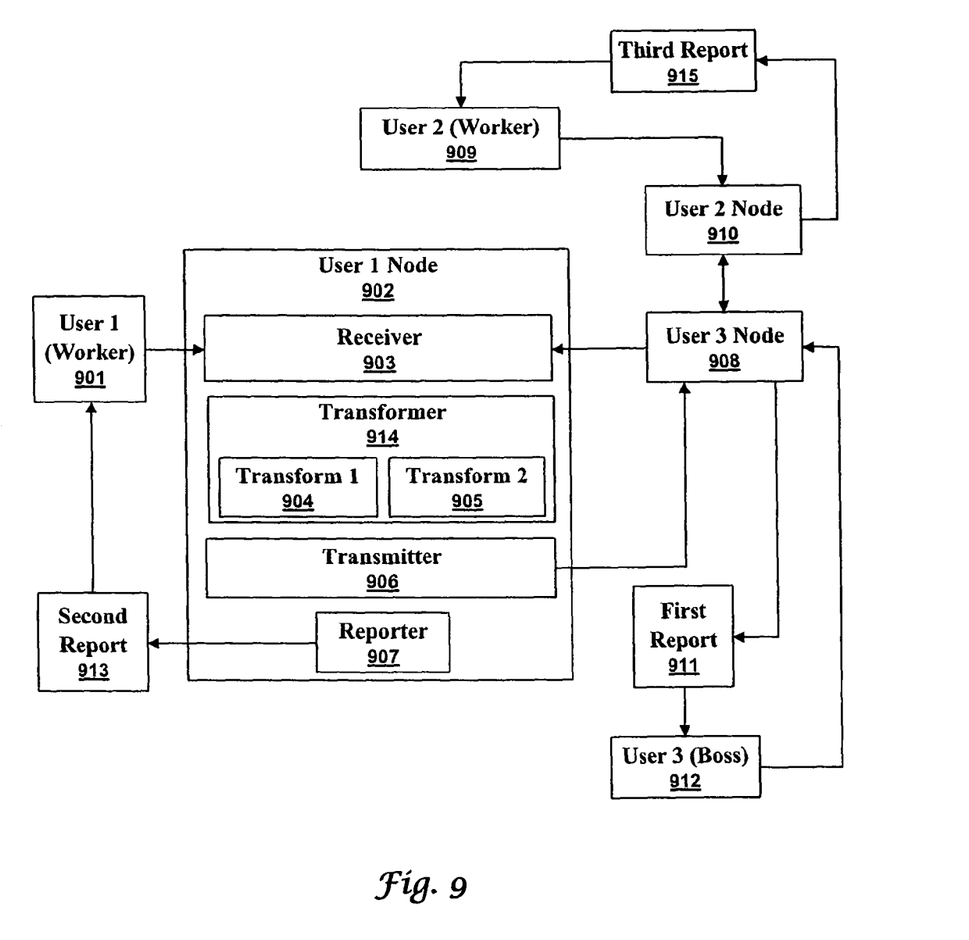
FIG. 9 illustrates a node with multiple transforms in accordance with aspects of some embodiments.

FIG. 9 illustrates a node with multiple transforms in accordance with aspects of some embodiments. User 1 901, acting as a data source, submits a node datum to the receiver 903 of user 1 node 902. User 1 node 902 transforms the data as needed and sends it to user 3 node 908. User 1 node 902 has a transformer 914 having transform 1 904 and transform 2 905. The transformer 914 can choose which transform to use. The choice of transform can be based on the node datum. For example, sales can be aggregated and rewards can be distributed. Aggregation is one type of transform, distribution is another type of transform. Another type of transform is the identity transform that does nothing to the node datum.

User 3 node 908 receives a node datum from user 2 node 910 after receiving a node datum from user 2 909. User 3 node 908 creates a first report 911 for user 3 912. User 3 912 responds to the report by sending a node datum to user 3 node 908 which then can transform and distribute the node datum to user 1 node 902 and user 2 node 910 which create reports. User 1 901 then receives the second report 913 while user 2 receives the third report 915.

Figure 10:
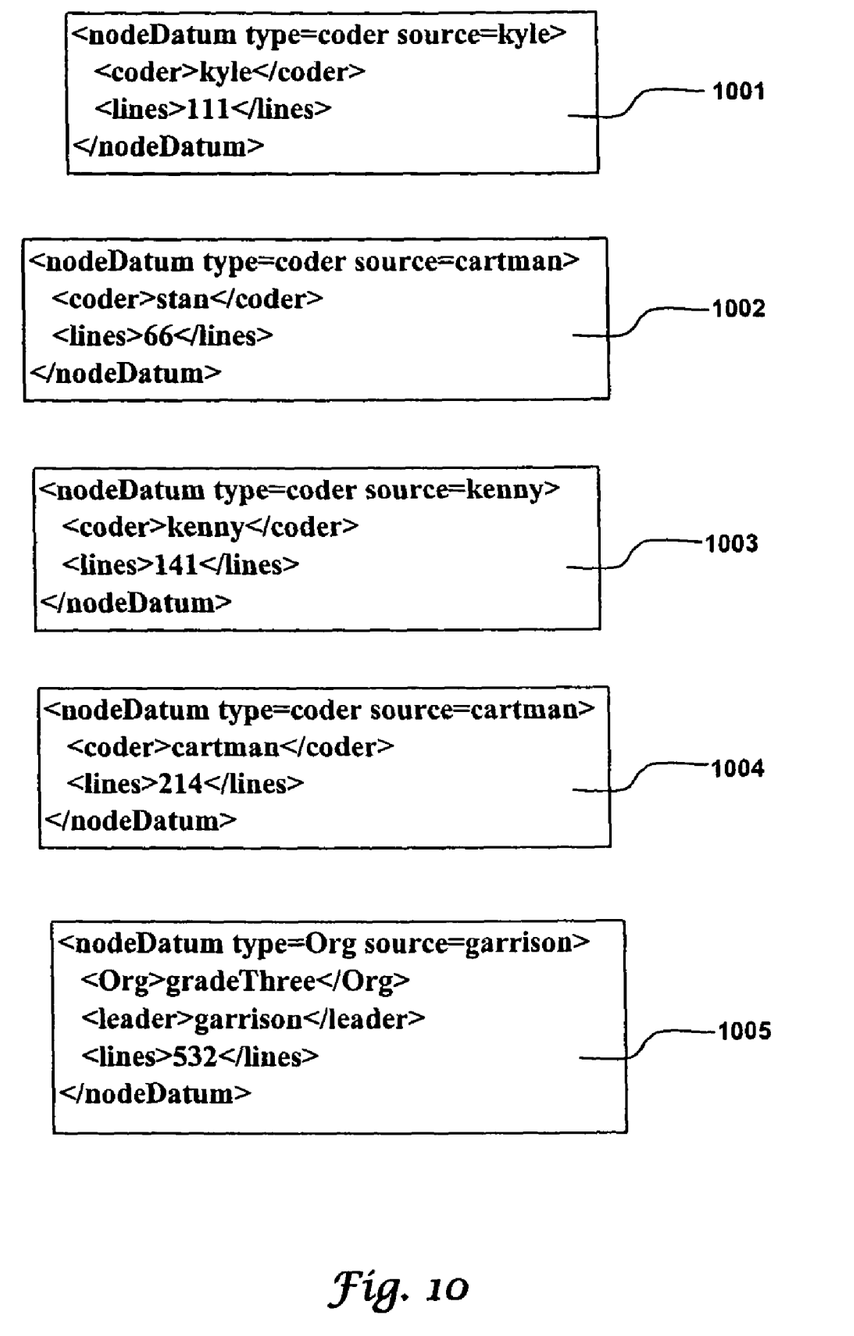
FIG. 10 illustrates productivity reported in node datums in accordance with aspects of some embodiments.

FIG. 10 illustrates productivity reported in node datums in accordance with aspects of some embodiments. Kyle, Stan, Kenny, and Cartman are programmers who report their daily code production to Mr. Garrison. Kyle creates a node datum 1001 reporting 111 lines. The node datums are illustrated as using a markup language although any defined data format can be used. Kenny creates a node datum 1003 reporting 141 lines. Cartman creates a node datum 1004 reporting a massive 214 lines. Cartman also creates a node datum 1002 for Stan reporting 66 lines. Perhaps Stan should not trust Cartman.

The programmer's node datums 1001-1004 are sent by each programmer's node to Mr. Garrison's node where they are aggregated to produce node datum 1005 reporting 532 lines were produced by Mr. Garrison's third graders. Node datum 1005 is sent to Principal Victoria.

Figure 11:
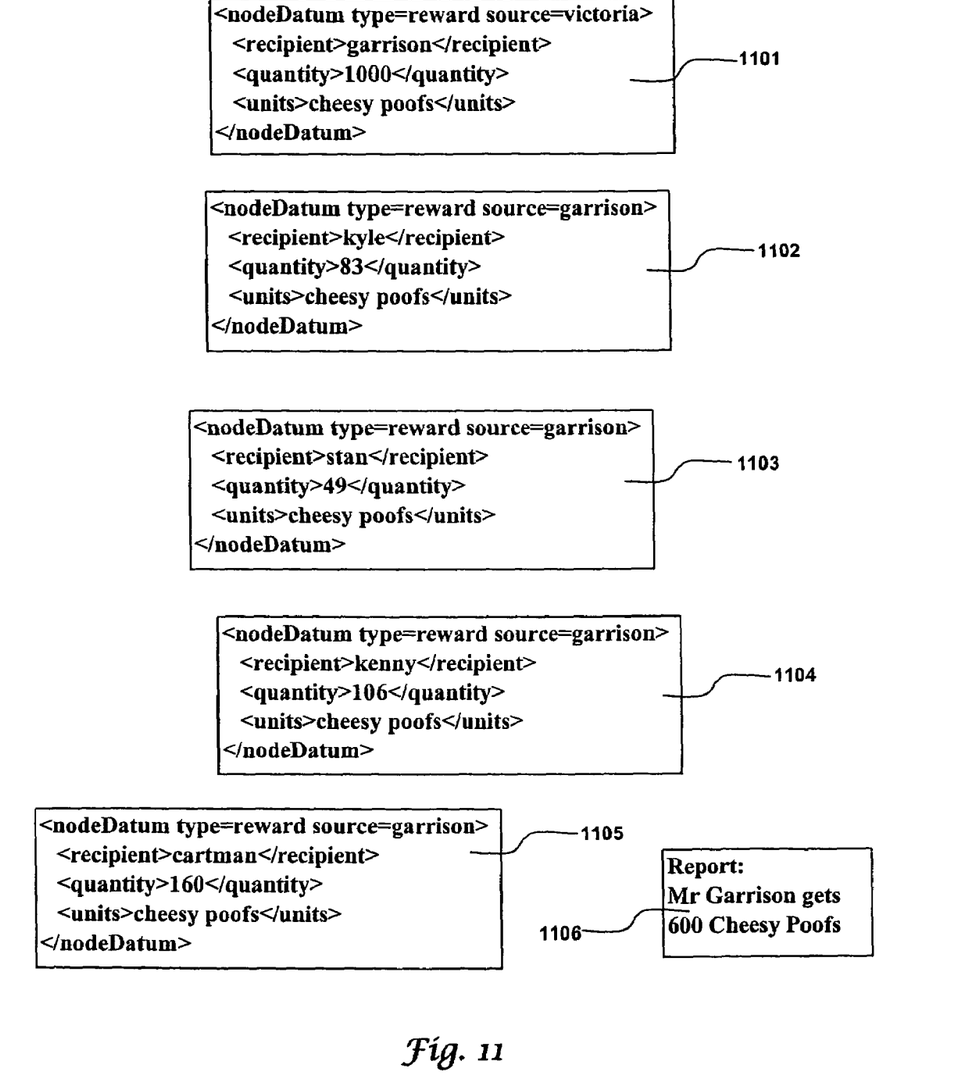
FIG. 11 illustrates rewards distributed by way of node datums in accordance with aspects of some embodiments.

FIG. 11 illustrates rewards distributed by way of node datums in accordance with aspects of some embodiments. Principal Victoria is rewarding the third graders with 1000 cheesy poofs in recognition of their 532 lines of code. She creates node datum 1101 which is sent to Mr. Garrison's node. Mr. Garrison's node uses a distribution transform to transform node datum 1101 by distributing the reward to Kyle, Stan, Kenny, and Cartman. The specific distribution that Mr. Garrison uses divides 40% of the reward to the programmers based on each programmer's reported productivity.

Mr. Garrison's node transforms Principal Victoria's node datum into node datums 1102-1105. Node datum 1102 rewards Kyle with 83 Cheesy Poofs. Node datum 1103 rewards Stan with 49 Cheesy Poofs. Node datum 1104 rewards Kenny with 106 Cheesy Poofs. Node datum 1105 rewards Cartman with 160 Cheesy Poofs. Mr. Garrison's node also generates report 1106 informing Mr. Garrison that he also gets Cheesy Poofs.

General

Embodiments can be implemented in the context of modules. In the computer programming arts, a module (e.g., a software module) can be implemented as a collection of routines, data structures, firmware and hardware that perform particular tasks or implement a particular abstract data type. Modules generally can be composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. Thus, for example, the term "module", as utilized herein generally refers to software modules or implementations thereof. Such modules can be utilized separately or together to form a program product that can be implemented through signal-bearing media, including transmission media and recordable media.

The examples discussed above are intended to illustrate aspects of the embodiments. The phrases "an embodiment", "some embodiments", or "certain embodiments" do not necessarily refer to the same embodiment or any specific embodiment.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A collaboration system that enables exchange of information between a plurality of users, comprising:
   a plurality of nodes, wherein each node is able to be configured to receive data from a user from the plurality of users, to alter data, to aggregate data from other nodes, and to produce a report to present data to a user according to a report definition;
   a node configuration module, running on at least one computer having hardware, that enables a user from the plurality of users to configure the plurality of nodes such that the plurality of nodes form a network that receives data from at least two users in the plurality of users, aggregates at least some of the received data, and generates a report to present at least some of the aggregated data to at least one user in the plurality of users,
   wherein the plurality of nodes are configured to enable exchange of information between the plurality of users.

2. The collaboration system of claim 1, wherein the node configuration module enables each user in the plurality of users to configure at least one node in the plurality of nodes.

3. A collaboration system, comprising:
   a node creation module that enables a user to create a first, second, third, and fourth node, wherein each node has configuration data;
   a database module implemented on at least one computer having hardware and configured to store the first, second, third, and fourth node;
   a node configuration module that enables a first user to configure:
      the first node's configuration data to receive data from a second user and determine a first node datum,
      the second node's configuration data to receive data from a third user and determine a second node datum, and
      the third node's configuration data to receive and aggregate the first node datum and second node datum to determine a combined node datum; and
   a report definition module that enables the first user to configure:
      a fourth node's configuration data to produce a first report to present the combined node datum as specified according to a first report definition to a fourth user,
   whereby the first user configures the first, second, third, and fourth nodes to enable collaboration of the second, third, and fourth users.

4. The system of claim 3, wherein the first node datum comprises a signature to validate that the first node datum was produced by the first node.

5. The system of claim 3, wherein the first node datum is encrypted.

6. The system of claim 3, wherein the first node datum comprises data identifying the first user.

7. The system of claim 3, wherein the node configuration module enables the first user to configure a fourth node's configuration data to transform the combined node datum, wherein the transformation alters the combined node datum.

8. The system of claim 3, wherein the node configuration module enables each of the second, third and fourth users to configure a node coupled to at least one of the group consisting of the first, second, third, and fourth nodes.

9. A method enabling collaboration between users, comprising:
   enabling a user to create a first, second, third, and fourth node, wherein each node has configuration data;
   storing, on at least one computer having hardware, the first, second, third, and fourth node;
   enabling a first user to configure:
      the first node's configuration data to receive data from a second user and determine a first node datum,
      the second node's configuration data to receive data from a third user and determine a second node datum, and
      the third node's configuration data to receive and aggregate the first node datum and second node datum to determine a combined node datum; and
   enabling the first user to configure:
      a fourth node's configuration data to produce a first report to present the combined node datum as specified according to a first report definition to a fourth user,
   whereby the first user configures the first, second, third, and fourth nodes to enable collaboration of the second, third, and fourth users.

10. The method of claim 9, wherein the first node datum comprises a signature to validate that the first node datum was produced by the first node.

11. The method of claim 9, wherein the first node datum is encrypted.

12. The method of claim 9, wherein the first node datum comprises data identifying the first user.

13. The method of claim 9, further comprising:
enabling the first user to configure a fourth node's configuration data to transform the combined node datum, wherein the transformation alters the combined node datum.

14. The method of claim 9, further comprising:
enabling each of the second, third and fourth users to configure a node coupled to at least one of the group consisting of the first, second, third, and fourth nodes.

* * * * *